Patented Sept. 20, 1938

2,130,807

UNITED STATES PATENT OFFICE 2,130,807

PRINTING COMPOSITION

Paul La Frone Magill and Charles Dangelmajer, Niagara Falls, N. Y., assignors to E. I. du Pont de Nemours & Company, Wilmington, Del., a corporation of Delaware No Drawing. Application November 8, 1934, Serial No. 752,119

7 Claims. (Cl. 134—35)

This invention relates to printing compositions, and more particularly to compositions which may be combined with dyes or pigments to produce improved printing inks or which may be used without the addition of coloring agents to provide protective coatings on paper or other surfaces.

It is required that printing inks shall not dry upon the type faces or inking rolls of the printing press but shall dry to the point where they will not easily smudge within a very short interval after they are placed in contact with the paper. This drying is brought about largely by absorption of the vehicle. The present forms of printing inks contain oils or oils and varnishes. Such inks are inflammable by nature.

For some purposes, it is desirable to print inks on waxy surfaces, e. g., on the coated side of carbon paper. The usual types of printing ink are unsatisfactory for this purpose, apparently because of partial solution of the waxes of the carbon paper in the vehicles of the printing inks, thereby bringing about a longer drying period.

An object of this invention is to provide printing compositions which do not evaporate readily in the open air but which at the same time are quickly absorbed by paper; a further object is to provide printing compositions which are suitable for printing on waxy surfaces; a further object is to produce non-inflammable printing compositions. A further object is to provide compositions suitable for coating or printing on waxy surfaces. Other objects will appear hereinafter.

These objects are accomplished by utilizing formamide as an ingredient in printing compositions.

Formamide possesses a unique combination of properties which we have found render it of particular value as a constituent of printing compositions. Among the advantageous properties of formamide for this purpose are:—its high boiling point, which tends to prevent drying on type faces and inking rolls; its ability to penetrate rapidly into the fibers of paper and other materials, thus facilitating rapid drying of the printed articles; its exceptional solvent power for a wide variety of adhesives, dyes and other materials which may be advantageously incorporated in printing compositions; its non-inflammability. It will be apparent that the advantages to be secured by our invention depend chiefly on the presence of formamide in printing compositions, although other ingredients may be added to modify the properties of such compositions. The present invention, therefore, comprehends broadly the incorporation of formamide in printing compositions without limitation as to other materials employed therein.

For certain printing or coating compositions, we prefer to use as a base or vehicle, a solution of casein in formamide and water, with or without pigment, dyes and/or other materials such as thickeners or solvents. We have discovered that the viscosity and tackiness (two important properties of printing and coating compositions) can be modified at will by adding varying amounts of methanol, benzene and/or ammonia; one or more of these three substances may be added as desired. Their addition produces the following respective effects: methanol increases the viscosity of the solution and decreases its tackiness; benzene decreases both the viscisty and tackiness; ammonia increases both viscosity and tackiness. Thus, by adding one or more of these substances in varying amounts, the desired viscosity and tackiness required for the specific purpose at hand can be obtained. With regard to ammonia, when this is used, pigments or other ingredients chemically incompatible therewith obviously should not be added. Thus, for example, we prefer not to use ammonia in a printing ink where aluminum powder is used as a pigment; on the other hand, titanium dioxide pigments may be satisfactorily used in compositions containing ammonia.

The following examples further illustrate our invention:

Example 1

An unpigmented printing composition was prepared by bringing into common solution 370 grams of formamide, 15 grams of cellulose acetate, 62.5 grams of casein and 100 cc. of methanol. This composition, when printed on the carbon-coated surface of a carbon paper, dried rapidly and resulted in blanking off the printed section of the carbon paper and rendering the printed section incapable of reproducing impressions.

Example 2

To the composition prepared as in Example 1 was added sufficient aluminum bronzing powder to bring about a satisfactory viscosity and opacity. The resulting ink then was applied to the coated side of a carbon paper. The carbon surface was readily wetted, there was a rapid penetration of the vehicle through the carbon surface into the paper body with good anchorage of the ink to the paper. The ink dried rapidly to the point where it would not smudge by loose contact with other paper surfaces.

Example 3

To 20.5 grams of the composition of Example 1, there was added 5 grams of carbon black. This resulted in a printing ink with desirable viscosity characteristics, slow evaporation in contact with air and rapid penetration when applied to paper.

Example 4

Three hundred grams of casein, 300 grams of formamide, 800 cc. of water and 20 cc. of 20% aqueous ammonia were brought into common solution by mixing cold and heating to 80° C. with stirring. With 200 grams of this mixture, there was emulsified 25 grams of linseed oil and 10 grams of castor oil. Pigment was added to produce the desired coloration. This ink gave good adherence and covering power on both waxed paper and ordinary uncoated paper.

Example 5

A solution of casein was prepared by heating on a water-bath a mixture of 70 grams of casein, 70 grams of formamide and 100 cc. of water. To this solution was added 21 grams of a benzene solution of cumaron resin containing 7 grams of the resin and the mixture agitated to form an emulsion. To 85 grams of this emulsion, was added as pigment, 17 grams of powdered aluminum to produce a printing ink.

Example 6

To a solution of 70 grams of casein, 70 cc. of formamide and 150 cc. of water was added about 36 grams of aluminum dust to make a printing ink.

Example 7

To 91 grams of the casein solution of Example 6 was added 11 cc. of methanol and 15 grams of aluminum dust. The resultant ink was more viscous and less tacky than the product of Example 6.

Example 8

A solution was made by dissolving one part of cumaron resin in two parts of benzene and 14 grams of this solution was emulsified with 75 grams of the casein solution of Example 6. To this emulsion was added 12 grams of aluminum dust. The resulting product was less viscous than the products of Examples 6 and 7; its tackiness was about the same as the product of Example 7.

In the above examples, casein and cellulose acetate have been employed as a thickening and binding agent; however, satisfactory products may also be obtained by using glue, gelatine, starch, rubber latex or other suitable adhesive material in place of casein or cellulose acetate. The properties of the compositions may be further modified as desired by the incorporation therein of materials such as oils, waxes and resins. As coloring agents, dyes may be used instead of pigments by making the necessary modifications in the concentrations of the other ingredients to produce a satisfactory viscosity.

We claim:

1. A printing composition comprising 15 to 70% of formamide and 2 to 25% of an adhesive selected from the group consisting of casein, glue and gelatine.

2. A printing composition comprising 15 to 70% of formamide, 2 to 25% of an adhesive selected from the group consisting of casein, glue and gelatine, and a pigment.

3. A printing composition comprising 15–70% of formamide and 10–25% of casein.

4. A printing composition comprising 15–70% of formamide, 10–25% of casein and a pigment.

5. A printing composition comprising 10–70% of formamide, 10–25% of casein, methanol in an amount sufficient to make said composition suitably viscous and tacky and a pigment.

6. A printing composition comprising 15–70% formamide, 10–25% casein, methanol, ammonia and a pigment.

7. A printing composition comprising 15–70% formamide, 10–25% casein, benzene and a pigment.

PAUL LA FRONE MAGILL.
CHARLES DANGELMAJER.

CERTIFICATE OF CORRECTION.

Patent No. 2,130,807. September 20, 1938.

PAUL LA FRONE MAGILL, ET AL.

It is hereby certified that error appears in the printed specification of the above numbered patent requiring correction as follows: Page 2, second column, line 33, claim 5, for "10-70%" read 15-70%; and that the said Letters Patent should be read with this correction therein that the same may conform to the record of the case in the Patent Office.

Signed and sealed this 25th day of October, A. D. 1938.

Henry Van Arsdale (Seal) Acting Commissioner of Patents.